United States Patent
Xiao et al.

(10) Patent No.: US 6,211,290 B1
(45) Date of Patent: Apr. 3, 2001

(54) MODIFIED POLYOLEFINS AND METHODS OF MANUFACTURING AND PAINTING SAME

(75) Inventors: Han Xiong Xiao, Bloomfield Hills; Mohammad Hailat, Dearborn, both of MI (US)

(73) Assignee: GX Associates, Inc, Bloomfield Hills, MI (US)

( * ) Notice: Subject to any disclaimer, the term of this patent is extended or adjusted under 35 U.S.C. 154(b) by 0 days.

(21) Appl. No.: 09/348,998

(22) Filed: Jul. 7, 1999

(51) Int. Cl.$^7$ ............... C08G 63/48; C08G 63/91; C08L 29/02; C08L 33/02; C08L 51/00

(52) U.S. Cl. ............... 525/70; 525/74; 525/78; 525/79; 525/80; 525/88; 525/191; 525/216; 525/221; 525/222; 525/223; 525/224; 525/226; 525/227; 525/240; 525/241

(58) Field of Search ............... 525/70, 74, 78, 525/79, 80, 88, 191, 216, 221, 222, 223, 224, 226, 227, 240, 241

(56) References Cited

U.S. PATENT DOCUMENTS

| | | |
|---|---|---|
| 3,856,889 | 12/1974 | McConnell . |
| 3,873,643 | 3/1975 | Wu et al. . |
| 3,882,194 | 5/1975 | Krebaum et al. . |
| 4,298,712 | 11/1981 | Machonis, Jr. et al. ............... 525/74 |
| 5,179,164 | 1/1993 | Lausberg et al. ............... 525/179 |
| 5,227,198 | 7/1993 | Laura et al. ............... 427/373 |
| 5,783,630 | 7/1998 | Evans et al. ............... 525/74 |

OTHER PUBLICATIONS

Ryntz and Clark, Toward Achieving a Directly Paintable TPO: Initial Paintability Studies, TPOs in Automotive, Executive Conference Management, Ann Arbor, MI (Oct. 1995).

De Vito et al., Functionalization of an Amorphous Ethylene–Propylene Copolymer by Free Radical Initiated Grafting of Unsaturated Molecules, J. Polymer Science: Polymer Chemistry Edition, vol. 22, 1335–1347 (1984).

*Primary Examiner*—Nathan M. Nutter
(74) *Attorney, Agent, or Firm*—Gary C. Cohn PLLC

(57) ABSTRACT

A polyolefin modified to contain a pendant polar chain structure of at least 200 molecular weight and which has at least one ester group and at least one hydroxyl and/or oxirane group is a useful adhesion-promoting modifier for polyolefin resins.

18 Claims, No Drawings

MODIFIED POLYOLEFINS AND METHODS OF MANUFACTURING AND PAINTING SAME

STATEMENT REGARDING FEDERALLY SPONSORED RESEARCH OR DEVELOPMENT

The research and development leading to the subject matter disclosed herein was not federally sponsored.

BACKGROUND OF THE INVENTION

This invention relates to modified polyolefins, especially a class of polyolefins useful as engineering thermoplastics that are known as "thermoplastic olefin" polymers, or "TPOs".

Vehicle manufacturers are increasingly looking to engineering thermoplastic materials as a lightweight, cost-effective replacement for metal and other polymer materials in many applications such as body panels, bumpers, doors, interior trim, etc. In addition to being lightweight and relatively low in cost, engineering thermoplastics provide increased design flexibility, favorable thermal and mechanical performance, and are recyclable.

One common class of engineering thermoplastics is thermoplastic polyolefins (TPOs). TPOs are blends of a polypropylene and an elastomer such as an ethylene-propylene copolymer, and often contain other additives such as fillers and pigments.

Polyolefins, generally, and TPOs, in particular, are nonpolar materials. Because they are nonpolar, many paints and adhesives do not adhere well to TPOs, because those paints and adhesives tend to be polar materials. Accordingly, it has been necessary to treat TPO parts prior to painting or gluing in order to increase the adhesion of the paint or of the adhesive to the TPO.

Treatments to enhance adhesion to TPOs fall into two main types. The first type is a surface treatment, which comes in several forms. The surface can be oxidized to increase its polarity, such as by a plasma treatment, corona discharge or surface etching. Another form of surface treatment is to apply a thin layer of a water- or solvent-based adhesion promoter or primer to the surface of the TPO. However, these surface treatments tend to significantly increase the cost of using TPO parts.

The second main type of TPO treatment involves modifying the TPO matrix itself so that when a part is molded from the TPO resin, no additional treatment steps are needed for adequate adhesion to coatings or adhesives. This second approach generally involves incorporating chemicals having polar groups into the TPO. A common approach involves the use of a modified polyolefin additive that has polar groups grafted onto a polyolefin backbone. One way of doing this is to graft or copolymerize an unsaturated anhydride and/or unsaturated ester compound into a polyolefin to form a somewhat polar additive. The additive is then blended into a TPO, thereby increasing its polarity and improving its adhesion to coatings and adhesives. This approach is described, for example, in U.S. Pat. No. 3,873,643 to Wu et al., U.S. Pat. No. 3,856,889 to McConnell, U.S. Pat. No. 3,882,194 to Krebaum et al., U.S. Pat. No. 4,298,712 to Machonis et al., and DeVito et al., J. Polym. Sci., Polym. Chem. Edit. 2; 1335p (1984). Unfortunately, it has been found that TPOs modified with additives of this type often do not have sufficient adhesion to coatings and adhesives.

A variation of the foregoing approach is described by R. Ryntz et al., "Toward Achieving Directly Paintable TPO: Initial Paintability Studies", TPOs in Automotive, Executive Conference Management, Ann Arbor, Mich., (October 1995) and in U.S. Pat. Nos. 5,179,164 and 5,783,630 to Evans et al. In this approach, a modifier is prepared by grafting unsaturated anhydride, ester or acid monomers onto a polypropylene backbone, and reacting that grafted material with a polyetheramine. The modifier is then blended with a TPO to improve its paintability. Unfortunately, the approach suffers from the drawbacks of using relatively expensive aminated polyethers as raw materials. In addition, the modified polypropylene is often prepared in situ by feeding polypropylene, grafted polypropylene and polyetheramine into an extruder. This may lead to some problems with inconsistency in the product and volatilization of the amine in the extruder.

It would be desirable to provide an efficient means for improving the adhesion of polyolefins, and TPOs in particular, with a minimal adverse impact on its desirable physical properties.

SUMMARY OF THE INVENTION

In one aspect, this invention is a modified polyolefin comprising a blend of a polyolefin polymer and an adhesion-promoting additive that is compatible with said polyolefin, wherein the adhesion-promoting additive contains a polyolefin backbone with at least one pendant polar chain structure having at least one ester linkage and at least one hydroxyl or oxirane moiety, said pendant polar chain structure having a molecular weight of at least about 200 daltons.

The modified polyolefin of this invention exhibits improved adhesion to a variety of coatings and adhesives, and as such can be, for example, formed into automotive body parts that are more easily painted or glued than are parts made from the polyolefin polymer alone. These modified polyolefins can be molded into parts that can be easily coated or glued using a variety of coatings or adhesives, with minimal surface preparation and without additional treatment to improve adhesion. In addition, the modified polyolefin will usually have physical properties that are quite similar to those of the polyolefin alone.

In a second aspect, this invention is an organic polymer having a polyolefin backbone and at least one pendant polar chain structure having at least one ester linkage and at least one hydroxyl or oxirane moiety, the pendant polar chain structure having a molecular weight of at least about 200 daltons. This polymer can be blended into a polyolefin to form a modified polyolefin having improved paintability and adhesion to a variety of types of adhesives.

In a third aspect this invention is a method comprising:
(a) reacting a functionalized polyolefin having at least one carboxylic acid, carboxylic acid anhydride or carboxylic acid ester group with a compound having at least two hydroxyl and/or oxirane groups to form an adhesion-promoting additive having a polyolefin backbone and at least one pendant polar chain structure of at least 200 molecular weight that contains at least one ester group and at least one hydroxyl or oxirane group and
(b) blending the adhesion-promoting additive from step (a) with a polyolefin resin in which the adhesion-promoting additive is compatible, in proportions such that the adhesion-promoting additive constitutes about 5 to about 50 weight-% of the blend.

DETAILED DESCRIPTION OF THE INVENTION

In this invention, a modified polyolefin having improved adhesion to a variety of coatings and adhesives is prepared by blending the polyolefin with a certain adhesion-promoting additive. The adhesion-promoting additive is compatible with the polyolefin and has a polyolefin backbone with at least one pendant polar chain structure. The pendant polar chain structure contains an ester linkage and at least one hydroxyl or oxirane moiety. In this invention, a pendant chain structure is considered as "polar" if it contains at least one ester group and at least one hydroxyl or oxirane group. The pendant polar chain structure is preferably linked to the polyolefin backbone through the ester group. The pendant polar chain structure has a weight of at least about 200 daltons.

The polyolefin backbone of the adhesion-promoting additive is generally polyethylene, polypropylene, a polymer of a $C_4$–$C_8$ alpha-olefin, a block or random copolymer of ethylene with propylene and/or a $C_4$–$C_8$ alpha-olefin, or a block or random copolymer of propylene and a $C_4$–$C_8$ alpha-olefin. The composition of the polyolefin backbone of the adhesion-promoting additive is advantageously selected so that the adhesion-promoting additive is compatible with the polyolefin resin to be modified. Thus, for example, in the preferred embodiment in which the polyolefin to be modified is polypropylene, the polyolefin backbone of the adhesion-promoting additive is preferably polypropylene or a random or block copolymer containing a major amount (at least 50% by weight) of polymerized propylene. Most preferably, the polyolefin portion of the modified polyolefin is polypropylene or a block or random copolymer containing primarily polymerized propylene.

In this invention, the adhesion-promoting modifier is considered to be "compatible" with a polyolefin resin if it can be melt blended therewith to form a grossly homogeneous blend on a macroscopic level and the blend can be molded without exhibiting visually-observable (without magnification) indicia of phase separation, such as the separation into layers or distinct phases.

The polyolefin backbone may contain repeating units of other monomers, provided that the adhesion-promoting additive is compatible with the polyolefin to be modified, and the adhesion-promoting characteristics of the additive are preserved.

Likewise, the molecular weight of the polyolefin backbone is selected primarily with compatibility with the polyolefin in mind, although molecular weight can affect processing as well. A number average molecular weight of about 3000 daltons or more is suitable, and is preferably at least about 4000 daltons. It is preferred that the molecular weight of the polyolefin backbone is no greater than about 30,000 daltons, preferably no greater than about 15,000, and more preferably no greater than about 10,000 daltons. Polyolefins having molecular weights in excess of these ranges tend to have higher melting temperatures, which makes it more difficult to conduct the reactions to make the adhesion-promoting additive.

The pendant polar chain structure contains an ester linkage and at least one hydroxyl or oxirane moiety. As discussed further below, the ester moiety preferably forms the linkage through which the pendant polar chain structure is bonded to the polyolefin backbone. The pendant polar chain structure may contain as few as one hydroxyl or oxirane moiety, but can contain more if desired.

The pendant polar chain structure has a number average molecular weight (including the ester moiety) of at least about 200 daltons, preferably at least about 250, more preferably at least about 500 daltons. Its weight is advantageously not greater than about 10,000, preferably not greater than about 8,000, and more preferably not greater than about 5000 daltons. When, as discussed below, the pendant polar chain structure is derived from an epoxy resin, the weight is preferably up to about 4000 daltons, and is preferably from about 225 to about 2000 daltons. When the pendant polar chain structure is derived from a polyether polyol, it preferably has a weight of from about 500, more preferably from about 900, up to about 10,000, preferably up to about 8000, more preferably up to about 4000 daltons. If the pendant polar chain structure is derived from a hydroxyl-functional acrylic resin, as discussed below, it preferably has a weight of at least about 2000, more preferably at least about 3000, up to about 10,000, more preferably up to about 8000 daltons.

The adhesive-promoting additive can be made in several ways. A convenient way uses certain functionalized polyolefins as starting materials.

The functionalized polyolefin has a polyolefin backbone that contains functional groups that can react with a hydroxyl group or an oxirane to form an ester. Examples of such groups include carboxylic acid ester, carboxylic acid and carboxylic acid anhydride groups. These groups can be introduced onto a polyolefin backbone in several ways. For example, monomers containing carboxylic acid ester, carboxylic acid or carboxylic acid anhydride groups can be copolymerized with an olefin to form a copolymer that contains functional groups. Another method is to graft an unsaturated carboxylic acid ester, acid or anhydride onto a polyolefin. This procedure creates a functionalized polyolefin in which the pendant carboxylic acid ester, acid or anhydride group or groups are formed on the polyolefin chain. Suitable such grafting methods are described in U.S. Pat. No. 3,873,643 to Wu et al., U.S. Pat. No. 3,856,889 to McConnell et al.; U.S. Pat. No. 3,882,194 to Krebaum et al., U.S. Pat. No. 4,298,712 to Machonis et al, and by Devito et al. in J. Polym. Sci. Polym. Chem. Edit., 22, 1335 (1984). Suitable monomers that can be copolymerized or grafted onto a polyolefin include ethylenically unsaturated monocarboxylic acids containing up to about 12 carbon atoms, including, for example acrylic acid and methacrylic acid; ethylenically unsaturated dicarboxylic acids having up to about 12 carbon atoms and their anhydrides, such as maleic acid, maleic anhydride, fumaric acid, fumaric anhydride, itaconic acid, itaconic anhydride and the like; and esters any of the foregoing mono- or dicarboxylic acids in which the ester group contains up to about 10 carbon atoms. Preferred ethylenically unsaturated esters include methyl, ethyl, n-butyl, t-butyl, n-hexyl, hydroxyethyl and hydroxypropyl esters of the foregoing mono-or dicarboxylic acids. Anhydride monomers are more preferred monomers, and maleic anhydride is especially preferred.

The functionalized polyolefin starting material can have a few as one carboxylic acid, ester or anhydride group per molecule. Preferably, functionalized polyolefin contains at least about 3%, more preferably at least about 5%, up to about 50%, preferably up to about 15%, more preferably up to about 10% by weight of polymerized monomers having carboxylic ester, acid or anhydride groups.

Materials suitable for use as the functionalized polyolefin starting materials are commercially available and include, for example, maleic anhydride-grafted polyolefins that are sold under the names Epolene (trademark) E-43 by Eastman Chemical Co.; Hostamont (trademark) TP AR 504 by Cladant Corp., and AC-1221 and ACRX 579-6 by Allied Signal Co. The material known as Epolene E-43 is especially preferred as a functionalized polyolefin starting material for preparing the adhesion-promoting additive.

The adhesion-promoting additive can be prepared by reacting the functionalized polyolefin starting material with a compound having at least two hydroxyl and/or oxirane groups and a number average molecular weight of at least about 172.

Among the polyols that can be reacted with the functionalized polyolefin are polyether polyols having at least two hydroxyl groups per molecules, as are formed in the polymerization of ethylene oxide, propylene oxide, 1,2-butylene oxide, 2,3-butylene oxide, tetramethylene oxide and mixtures thereof. These polyethers contain repeating oxyalkylene groups. Polyether polyols containing oxyethylene units are preferred, and more preferred are homopolymers of ethylene oxide and random or block copolymers of ethylene oxide and propylene oxide. Suitable polyether polyols have as many as 8 or more hydroxyl groups per molecule, preferably have from about 2–4 hydroxyl groups per molecule, and most preferably are diols. The polyether polyol preferably has a number average molecular weight of at least about 500, preferably at least about 900, and not greater than 10,000, more preferably not greater than about 8000 daltons.

Polyester polyols can also be reacted with the functionalized polyolefin to form the adhesion-promoting additive. Suitable polyester polyols include polymers of cyclic lactones such as poly (caprolactone) glycols, and also include the reaction product of a dicarboxylic acid and a glycol and, optionally, a small quantity of a compound having three or more hydroxyl groups per molecule. Among the polyesters of the latter type are polymers of adipic acid and ethylene glycol, propylene glycol, butanediol, hexamethylene glycol and the like. Other polyester polyols, such as those made from terephthalate esters, may also be used. When a polyester polyol is used, its molecular weight and number of hydroxyl groups are advantageously as described above with respect to the polyether polyols.

A third type of polyol that can be reacted with the functionalized polyolefin is a hydroxyl-functional acrylic resin. Suitable acrylic resins of this type contain at least two hydroxyl groups per molecule and preferably have a hydroxyl equivalent weight of at least about 80 (hydroxyl value 701), more preferably at least about 130 (hydroxyl value 432), most preferably at least about 400 (hydroxyl value 140), up to about 5000 (hydroxyl value 11), more preferably up to about 3000 (hydroxyl value 19), most preferably up to about 1400 daltons (hydroxyl value 40). Such hydroxyl-functional acrylic resins include homopolymers of hydroxyethyl acrylate, hydroxyethyl methacrylate, hydroxypropyl acrylate, hydroxypropyl methacrylate and the like. Those monomers may be copolymerized with other copolymerizable monomers, such as other acrylic monomers, if desired. Preferred hydroxyl-functional acrylic resins are copolymers of hydroxyethyl acrylate or hydroxyethyl methacrylate and another copolymerizable acrylic monomer.

Other polyols that may be reacted with the functionalized polyolefin to make the adhesion-promoting additive include homopolymers and copolymers of vinyl alcohol, and cellulosic resins such as hydroxypropyl cellulose or hydroxyethylcellulose.

Compounds having two or more oxirane groups can also be reacted with the functionalized polyolefin starting material to form the adhesion-promoting additive. Such compounds include epoxy resins of various types, including aromatic epoxy resins such as those based on bisphenol A, Novolac resins, as well as aliphatic or cycloaliphatic epoxy resins. When an epoxy resin is used to form the adhesion-promoting additive, it advantageously contains more than 1, preferably at least 2 oxirane groups and no greater than 5, preferably no greater than 4 oxirane groups. The epoxy resin advantageously has an equivalent weight of at least 90, preferably at least 100 and no greater than about 2000, preferably no greater than about 1000.

The functionalized polyolefin and the polyol or oxirane compound are reacted together to form the adhesion-promoting additive. Reaction conditions are sufficient to cause hydroxyl groups on the polyol to react with carboxylic ester, acid or anhydride groups on the functionalized polyolefin to form ester linkages. Esterification reactions are very well known and as a general matter conditions that are commonly employed for those reactions are suitable. The reaction is advantageously conducted at a temperature above the melting temperature of the functionalized polyolefin and the polyol, with a temperature of from about 180° C. to about 210° C. being suitable. At those temperatures, a reaction time of from about 20 to about 50 minutes is generally suitable. A catalyst such as a metal oxide may be used in order to speed the reaction. An antioxidant can be used to avoid the oxidation of the reactants at the high reaction temperatures. Reaction conditions are selected to avoid production of significant amounts of cross-linked reaction products.

When the functionalized polyolefin contains ester groups, the reaction is advantageously conducted in the presence of an effective amount of a transesterification catalyst and under conditions such that low molecular weight alcohols and other byproducts that are formed are continuously removed from the reaction mixture.

It is preferred that the mole ratio of functionalized polyolefin to polyol or oxirane compound is at least about 0.7:1, preferably at least 0.85:1, most preferably at least 0.9:1, up to about 5:1, preferably up to about 3:1, more preferably up to about 1.3:1 and most preferably about 0.9–1.1:1.

The resulting adhesion-promoting additive is blended with a polyolefin resin in an amount that improves the adhesion of the polyolefin to a coating or adhesive. The polyolefin resin may be a homopolymer of, for example, ethylene, propylene, a $C_3$–$C_8$ alpha-olefin; a random or block copolymer of two or more of the foregoing monomers; or a random or block copolymer of one or more of the foregoing monomers with another monomer such as vinyl acetate or an acrylate monomer. Of particular interest are polyethylene homopolymer, polypropylene homopolymer, or random or block copolymers of ethylene and propylene or of ethylene and a $C_3$–$C_8$ alpha-olefin. Polypropylene is a preferred polyolefin, as it is used in making a variety of automotive parts that are commonly painted or adhered to other parts.

In an especially preferred embodiment, the polyolefin contains an elastomer that is dissolved or dispersed within the polyolefin. Such elastomers generally impart improved impact resistance to the polyolefin. Suitable elastomers include terpolymers of ethylene, propylene and a conjugated diene (EPDM elastomers), certain ethylene-propylene copolymers (EP rubbers), certain acrylate polymers, and others as described in Methoden der organischen Chemie (Houben-Weyl) volume XIV/1, Makromolekulare Chemie (Georg-Thieme-Verlag, Stuttgart, 1961) pp. 390–406. Elastomer-modified polypropylene resins commonly known in the art as "thermoplastic polyolefin" resins, or "TPO" are the most referred polyolefin for use according to this invention. Among suitable TPO resins are those sold under the tradenames "Himont CA53A", "Amoco 1016" (by Amoco Chemical), "Dexflex D-161B" (by Solvay Engineered Polymers Co.) and "Keltan TP-0552-2" (by Dutch State Mines).

The polyolefin may also contain additives such as fillers, reinforcements, pigments, dyes, antioxidants, preservatives, lubricants, slip additives, and the like.

The amount of adhesion-promoting additive used is sufficient to increase the adhesion of the polyolefin resin to a coating or adhesive, as measured by the crosshatch adhesion test of ASTM D-3359. Adhesion to a cured bisphenol-A epoxy coating, particularly a cured glycidyl ether of bisphenol-A, is a suitable way to evaluate such increased adhesion. A convenient such epoxy coating for evaluating the adhesion of the blend of this invention is composed of 100 parts by weight Araldite (trade name) GY 6004, 73.7 parts Araldite GY 508 and 34.7 parts of Hardener XU HY 355, all available from Ciba-Geigy, cured at room temperature and ambient humidity for 72 hours prior to testing. In the ASTM D-3359 method, results are evaluated on a scale of zero to "5", with higher numbers indicating better adhesion. Sufficient of the adhesion-promoting additive is present in the blend of this invention that the blend exhibits a score of at least two unit, preferably at least three units, more preferably at least four units higher on the ASTM D-3359 method, using an epoxy coating of the type just described, than does the unmodified polyolefin. Preferably, sufficient of the adhesion-promoting additive is present that a score of at least "4" is obtained.

Results on the ASTM D-3359 test as just described are typically obtained when the modified polyolefin contains from about 2, preferably from about 5, more preferably about 10, most preferably about 15, to about 50, preferably about 40, more preferably about 30, most preferably about 25 parts by weight adhesion-promoting additive per 100 parts of blend, exclusive of any fillers or reinforcements that may be present. It will appreciated that the quantity of the adhesion-promoting additive necessary to provide satisfactory adhesion may vary somewhat depending on the particular coating or adhesive that is used. Thus, the foregoing amounts are provided as typical values, but more or less of the adhesion-promoting additive may be desirable for use in specific applications.

The polyolefin resin and the adhesion-promoting additive are advantageously blended using a melt-blending technique. A suitable apparatus for accomplishing this is a conventional screw extruder. The polyolefin resin and the adhesion-promoting additive are fed into the extruder in the desired proportions, where they are heated to a temperature above their melting temperature and mixed through action of the extruder screw. The mixture is then extruded out through the die, allowed to cool and preferably pelletized or otherwise formed into small particles suitable for use in commercial thermoplastic molding process. The blend may be re-extruded one or more times in order to increase the homogeneity of the blend.

The modified polyolefin of this invention can then be used in the same manner as the base polyolefin in a large number of applications. This modified polyolefin is particularly suitable for use in applications in which it will be coated or adhered to another material. Such applications include exterior automobile and truck body parts, including front and rear fascia, quarter panels, doors, fenders, hoods, trunk lids, roofs, light housings, trim pieces, and the like. The modified polyolefin can be molded using a variety of molding techniques as are appropriate for the type of part being produced and the particular polyolefin resin used. For the manufacture of automotive parts, injection molding or extrusion processes are particularly suitable.

After molding, the parts made from the modified polyolefin of this invention are often directly paintable after appropriate cleaning as desired to remove surface contamination. The parts may often be painted without previous treatment or priming.

Because of the improved adhesion of the modified polyolefin of this invention, it can be coated with a wide variety of coatings, including, for example, polyester, acrylic, polyurethane, melamine, alkyd, polyvinyl ether, polyvinyl ester, polystyrene, polyacrylamide, acrylate, methacrylate or polyfluorinated polymer coatings. The coatings can be solvent-based or water-borne, and may contain pigments and other additives as are commonly used in coating or paint formulations.

Similarly, a wide range of adhesives work well with the modified polyolefin of this invention, including epoxies, polyurethanes, polyacrylates, casein glues, starch-based glues, cellulosics, natural or synthetic rubbers such as butyl rubber, polyisobutylenes, nitrile rubbers, styrene butadiene rubbers and thermoplastic rubbers; carboxylic polymers, neoprenes, polysulfides, phenolic resins, resorcinolic resins, amino acid resins, vinyl acetate-ethylene copolymers, polyvinyl acetals, anaerobic adhesives such as cyanoacrylate adhesives, polyamides, aromatic polyimides, silicones, organofunctional silanes, and the like.

The following examples are provided to illustrate the invention, but are not intended to limit the scope thereof. All parts and percentages are by weight unless otherwise indicated.

PREPARATION OF EXAMPLES 1–13 AND COMPARATIVE SAMPLE A

A series of adhesion-promoting additives are prepared from a commercial maleic anhydride-grafted polypropylene. The maleic anhydride-grafted polypropylene used is Epolene E-43, sold by Eastman Chemical Co. According to its manufacturer, Epolene E-43 has a molecular weight of about 4500, an acid number of 47 and a softening temperature of 157° C.

To make Example 1, two hundred forty parts of Epolene E-43 maleic anhydride grafted polypropylene, 81.4 parts of a 1450 molecular weight polyethylene glycol (from BASF Co.) and 1.6 parts of a commercially available antioxidant, Irgoro 1010 (trade name) (from Ciba Geigy Co.) are charged to a reaction kettle equipped with a stirrer, heating jacket, thermometer. The mole ratio of Epolene E-43 and the polyethylene glycol is 0.95:1. The mixture is heated to 190–200° C. with stirring until a homogeneous uniform liquid is obtained. The mixture is then heated an additional 30–40 minutes at 200–210° C. The resulting product is then poured out at a temperature of about 160–180° C. onto an aluminum plate. After cooling, a tough, solid reaction product with light brown color is obtained. Using a household coffee grinder, it is then ground into coarse particles about 0.5–1.0 mm in diameter.

The resulting particles of the adhesion-promoting additive are mixed by hand with pellets of a commercial TPO product, Dexflex D-161B, (Solvay Engineered Polymers Co.) at a weight ratio of 20/80 in a plastic beaker and added into the hopper of a multi-zone extruder. All zones of the extruder are set at 200–205° C., and the screw rotated at 80–90 rpm. After the mix is extruded, it is pelletized and extruded a second time under the same conditions in order to obtain a more homogeneous blend. This product is Modified TPO (MTPO) Example 1.

MTPO Example 1 is then injection molded at a temperature 176–188° C. and an injection pressure of about 500–550 psi to make test panels.

MTPO Examples 1A and 1B made in the same manner, except the concentrations of adhesion-promoting additive are only 10% and 15%, respectively.

MTPO Examples 2, 3, 4 and 5 are made and molded in the same manner as Example 1, except the amounts of Epolene E-43 and polyethylene glycol are adjusted in each case to provide a molar ratio of 0.75:1, 0.85:1, 1.15:1 and 1.25:1, respectively. All contain 20% of the adhesion-promoting additive. Test panels are prepared from each of MTPO Examples 2–5 as described above.

MTPO Examples 6–9 are also made in the same manner as Example 1, except the polyethylene glycol is replaced in each instance with a mixture of polyethylene glycols of differing molecular weights. In each case the mole ratio of E-43 to polyethylene glycol is 0.95:1. The polyethylene glycol mixtures used in making MTPO Examples 6–9 are as follows:

Example 6: 10/30/40/20 blend of 8000, 4000, 2000 and 1450 MW polyethylene glycols.

Example 7: 10/70/10/10 blend of 8000, 4000, 2000 and 1450 MW polyethylene glycols.

Example 8: 50/50 blend of 4000 and 2000 MW polyethylene glycols.

Example 9: 29/71 blend of 4000 and 2000 MW polyethylene glycols.

MTPO Examples 10–12 are prepared in a manner similar to Example 1, using epoxy resins or a mixture thereof and the E-43 material to produce an adhesion-promoting additive. In each case, the adhesion-promoting additive is made by reacting the E-43 and the epoxy resin (or mixture) for about 20 minutes at 180–190° C. The additive is then blended with a TPO as described above with respect to Example 1. Test panels are molded as described above.

In MTPO Example 10, the epoxy resin is a bisphenol type epoxy sold by Ciba Geigy under the designation Araldite GY 6004. The mole ratio of the E-43 to the epoxy resin is 1:4.5. In MTPO Example 11, the epoxy resin is a bisphenol type epoxy sold by Ciba Geigy as Araldite GY 508, and the mole ratio of E-43 to epoxy resin is 1:1.06. In MTPO Example 12, a mixture of epoxy resin GY 6004 and a 1450 MW polyethylene glycol is used to make the adhesion-promoting additive, the mole ratios being 1 (E-43):1.7(epoxy):1.07 (PEG). In all cases, the blend contains 20% by weight of the additive.

MTPO Example 13 is made by mixing 4.6 parts by weight of a commercially available hydroxy-functional acrylic resin (587, sold by Johnson Polymer Corp., having a hydroxyl equivalent weight of about 1220) with 100 parts by weight of a 1450 molecular weight polyethylene glycol. The resulting mixture is then reacted with E-43 as described in Example 1. The mole ratio of E-43 and the acrylic resin/PEG blend is 0.95:1.

Testing of Examples 1–13 and Comparative Sample A

Crosshatch adhesion testing described below is performed according to ASTM D-3359 in which crosshatching is done using a multi-tooth cutter made by Paul N. Gardner Co., Inc., or in a modification of that test procedure in which a single-blade tool is used to do the crosshatching. The same results are obtained using either tool.

A. Comparison of MTPO Example 1 and Comparative Example A

The adhesion of a solventless epoxy coating to test panels of MTPO Example 1 is evaluated in the following manner. 3×5 inch test panels are prepared and are coated with a mixture of two commercial epoxy coatings, Araldite GY 6004 and Araldite GY 508 with a commercially available epoxy hardener, Hardener XU HY 355, at a weight ratio of 100:73.7:34.7. The coating is cured at room temperature for 72 hours before being tested for crosshatch adhesion. For comparison, control test panels are made from the TPO alone, without any of the adhesion-promoting additive (Comparative Sample A). Results of this testing are as shown in Table 1.

TABLE 1

Adhesion of Unmodified TPO (Comp. Sample A) and Modified TPO (Example 1) to Epoxy Coating

| Specimen | Curing Conditions | Crosshatch Adhesion Rating |
| --- | --- | --- |
| Comparative Sample A | Room temperature, 72 hours | 0* |
| MTPO Example 1 | Room temperature, 72 hours | 5* |

*A rating of "0" means that more than 90% of the epoxy coating is removed in the crosshatch adhesion test, indicating a very substantial failure. A rating of "5" means that none of the epoxy coating is removed in the test. Thus, the adhesion of MTPO Example 1 to the epoxy coating is improved substantially over that of the unmodified resin.

The improved adhesion of the epoxy coating to the panels of MTPO Example 1 is indicated in another way. Upon bending the coated MTPO Example 1 test panels, the epoxy coating cracks, but remains adhered to the panels. When the test panels of the unmodified TPO are bent in similar fashion, the epoxy coating becomes completely detached.

B. Adhesion of MTPO Examples 1–5 to an Epoxy Resin

The adhesion of MTPO Examples 1–5 to an epoxy coating is further tested using a lap shear strength test. The same epoxy/hardener described in A above is used to adhere together panels of each of MTPO Examples 1–5, using an overlap area of 2 mm×3 mm. After applying the epoxy and joining the panels, the epoxy is cured for 72 hours at room temperature and ambient humidity before testing. For comparison, the lap strength obtained with panels of Comparative Sample A is also evaluated. The results are as follows:

TABLE 2

Unmodified TPO (Comp. Sample A) and Modified TPO (Examples 1–5), Lap Shear Strength with Epoxy Adhesive

| Specimen No. | E-43:PEG mole ratio in Adhesion-Promoting Additive | Adhesion-Promoting Additive (w/w) | Lap Shear Strength (psi) |
| --- | --- | --- | --- |
| Comparative Sample A | N/A | 0 | 45 |
| Example 1 | 0.95:1 | 20% | 199 (cohesive failure) |
| Example 2 | 0.75:1 | 20% | 129 |
| Example 3 | 0.85:1 | 20% | 127 |
| Example 4 | 1.15:1 | 20% | 140 |
| Example 5 | 1.25:1 | 20% | 138 |

As shown in Table 1, in all cases the modified TPO of this invention exhibits far superior adhesion to the epoxy resin than does the Comparative Sample, which contains no adhesion-promoting additive.

C. Adhesion of MTPO Examples 1 and 13 to an Epoxy Resin

The adhesion of MPTO Example 13 to an epoxy coating is evaluated using a lap shear strength test as described above. MTPO Example 1 is re-tested for comparison. The results are as reported in Table 3.

TABLE 3

Effect of Hydroxy-Functional Acrylic Resin on Lap Shear Strength (Epoxy Adhesive)

| Example No. | Wt.-% Acrylic Resin Added | Mole ratio, E-43: polyols, in Adhesion-Promoting Additive | Lap Shear Strength (psi) |
|---|---|---|---|
| 1 | 0 | 0.95:1 | 150 |
| 13 | 4.6 | 0.95:1 | 160 |

The results reported in Table 3 indicate that adhesion to the two-part epoxy resin, as measured by lap shear strength, is further increased by using a small proportion of a hydroxy-functional acrylic resin in making the adhesion-promoting additive.

D. Effect of Modifiers on Physical Properties of TPO

Mechanical property testing is performed on test panels made from each of MTPO Examples 1–5 and Comparative Sample A. Results are as reported in Table 4.

TABLE 4

Comparison of Mechanical Properties of Unmodified TPO with MTPO Examples 1–5

| Property | Ex. 1 | Ex. 2 | Ex. 3 | Ex. 4 | Ex. 5 | A* |
|---|---|---|---|---|---|---|
| Mole Ratio (E-43/PEG | 0.95 | 0.75 | 0.85 | 1.15 | 1.25 | N/A |
| Wt.-% Adhesion-Promoting Additive | 20 | 20 | 20 | 20 | 20 | 0 |
| Tensile Str., psi | 2770 | 2544 | 2659 | 2889 | 2893 | 2780 |
| Elongation, % | 11 | 23 | 16 | 13 | 14 | 14 |
| Young's modulus, thousand psi | 107.9 | 97.1 | 75.4 | 81.4 | 96.7 | 91.1 |

*Not an example of the invention.

Tensile, elongation and Young's modulus are not greatly affected by the presence of 20 wt.-% adhesion-promoting additive. Accordingly, the modified TPO of this invention can be directly substituted into most applications for which unmodified TPO is useful, with little effect on mechanical performance.

E. Effect of Acrylic Resin on Physical Properties

Mechanical property testing is performed on test panels made from MTPO Example 13. For comparison, testing is repeated on MTPO Example 1. Results are as reported in Table 5.

TABLE 5

Effect of Hydroxy-functional Acrylic Resin on Mechanical Properties

| | Example No. | |
|---|---|---|
| Property | 1 | 13 |
| Mole Ratio, E-43 to Polyols in Adhesion-Promoting Additive | 0.95:1 | 0.95:1 |
| Wt.-% Acrylic Resin in Polyol Mixture | 0 | 4.6 |

TABLE 5-continued

Effect of Hydroxy-functional Acrylic Resin on Mechanical Properties

| | Example No. | |
|---|---|---|
| Property | 1 | 13 |
| Tensile Strength, psi | 2295 | 2948 |
| Elongation, % | 9 | 4 |
| Young's Modulus, psi | 92,250 | 196,500 |

The incorporation of the hydroxy-functional acrylic resin is seen to decrease elongation and increase Young's modulus and tensile strength.

F. Adhesion Testing to Various Waterborne Coatings

Test panels made from MTPO Example 1 are further evaluated for adhesion to a number of types of waterborne coatings according to the ASTM D-3359 crosshatch adhesion test or the modified test. In each case, duplicate test panels are prepared, one of which is cured at room temperature for 3–4 days and another that is cured at 121° C. for 25 minutes. The types of coating and the results are as reported in Table 6.

TABLE 6

Crosshatch Adhesion of Various Coatings to MTPO Example 1

| Coating Type | Rating*, RT cure | Rating*, high-temperature cure |
|---|---|---|
| Polyurethane (NeoRez R960, Zeneca Resin Co.) | 2 | 5 |
| Polyurethane (NeoRez R962, Zeneca Resin Co.) | 3 | 5 |
| Polyurethane (NeoRez R9649, Zeneca Resin Co.) | 3 | 5 |
| Alkyd (NeoRez R9403, Zeneca Resin Co.) | 2 | 5 |
| Polyurethane (Sancure 898, BF Goodrich Specialty Chem. Co.) | 0 | 2 |
| Polyurethane (Sancure 825, BF Goodrich Specialty Chem. Co.) | 2 | 4.5 |
| Alkyl (Resydrel VAY 6278, Hoechst Celanese) | 2 | 5 |
| Alkyld (Resydrel AY 586, Hoechst Celanese) | 2 | 5 |
| Alkyl (Patriot Paint Co. Inc.) | 3 | 5 |

*Ratings of 2, 3 and 4.5 indicate removal of approximately 50%, 20% and 2–3% of the coating, respectively, on the crosshatch adhesion test.

For comparison, ratings of "0" are obtained in all cases when a test panel of the unmodified TPO (Comparative Sample A) is evaluated.

G. Adhesion of MTPO Examples 1, 1A and 1B to Polyurethane Coatings

To evaluate the effect of varying the concentration of adhesion-promoting additive, separate test panels of MTPO Examples 1, 1A and 1B are coated with a solvent based, two-part (2K) pigmented (white) polyurethane coating and a solvent-based, two part (2K) clear polyurethane coating. The adhesion of the coatings to the test panels is evaluated according to the crosshatch adhesion test. The polyurethane coatings are designed for sheet molding compound (SMC). The pigmented coating bears the PPG Industries product designations TKPS 66L10B (polyol side) and Cat110 (polyisocyanate side). The clear coating bears PPG Industries product designations TKRC 200A (polyol side) and Cat110. In all cases, the coatings are cured at 121° C. for 25 minutes and cooled to ambient temperature before testing. The results are as reported in Table 7.

TABLE 7

Adhesion of MTPO Examples 1, 1A and 1B to Solvent-Based Polyurethane Coatings.

| | | Crosshatch Adhesion Rating | |
|---|---|---|---|
| Example No. | Wt.-% Additive | Pigmented Polyurethane | Clear Polyurethane |
| 1 | 20 | 5 | 3 |
| 1B | 15 | 4 | 0 |
| 1B | 10 | 0 | 0 |

The results of the testing of MTPO Examples 1, 1A and 1B show that, for the particular polyurethane coated evaluated, at least about 15% of the E-43/1450 MW PEG product is needed to obtain adhesion to the pigmented polyurethane and between and 20% is needed to obtain adhesion to the clear polyurethane coating. As shown in the foregoing tables, however, results depend somewhat on the particular coating under study, and it is believed that MTPO Example 1A contains a sufficient amount of the adhesion-promoting additive to cause it to adhere to a number of coatings that do not adhere to the unmodified TPO.

H. Adhesion of MTPO Examples 1–5 to Polyurethane and Melamine Coatings

Test panels of MTPO Examples 1–5 and Comparative Sample A are tested for adhesion to polyurethane and melamine coatings using the crosshatch adhesion test. The polyurethane coating is a solvent-based two part (2K) polyurethane bearing the PPG Industries product designations TKPS 66L10B (polyol side) and Cat110 (polyisocyanate side) The melamine coating is a two-part (2K) commercial product bearing PPG Industries designations CBCK 8555A 2755-2802A and 123 2755-28-2B. In all cases, the coating is cured at 121° C. for 25 minutes, and the test panel cooled to ambient temperatures before testing. The results are as indicated in Table 8.

TABLE 8

Adhesion of MTPO Examples 1–5 to Two-Part Polyurethane and Melamine Coatings

| | | | Crosshatch Adhesion Rating | |
|---|---|---|---|---|
| Example No. | Mole ratio E-43/PEG | Wt. % additive | Urethane Coating | Melamine Coating |
| 1 | 0.95:1 | 20 | 5 | 5 |
| 2 | 0.75:1 | 20 | 5 | 5 |
| 3 | 0.85:1 | 20 | 3 | 3 |
| 4 | 1.15:1 | 20 | 4.5 | 3.5 |
| 5 | 1.25:1 | 20 | 5 | 3.5 |
| A* | N/A | 0 | 0 | 0 |

*Not an example of the invention.

Again, substantially superior adhesion is obtained when the adhesion-promoting additive is used.

I. Adhesion of MTPO Examples 6–9 to Various Melamine Coatings

The adhesion of three different melamine coatings to Examples 6–9 is evaluated using the crosshatch adhesion test. Melamine coating 1 is a cured mixture of a polyester having a hydroxyl value of 165 and an acid number of 7 with a commercially available curative sold under the trade designation Cymel 1170. Melamine coating 2 is a cured mixture of the same polyester with Cymel 1125 curative. Melamine coating 3 is a cured mixture of the same polyester with Cymel 303 curative. All coatings are cured at 120° C. for 25 minutes and then cooled to ambient conditions before testing. Results are as reported in Table 9. For comparison, the crosshatch adhesion of the unmodified TPO (Comparative Sample A) to these coatings is evaluated, and the results are as reported in Table 9.

TABLE 9

Adhesion of MTPO Examples 6–9 to Various Melamine Coatings

| | | Crosshatch Adhesion Rating | | |
|---|---|---|---|---|
| Specimen No. | Wt. % Additive | Melamine Coating 1 | Melamine Coating 2 | Melamine Coating 3 |
| A* | 0 | 0 | 0 | 0 |
| 6 | 20 | 5 | 5 | 5 |
| 7 | 20 | 5 | 5 | 5 |
| 8 | 20 | 5 | 5 | 5 |
| 9 | 20 | 5 | 5 | 5 |

*Not an example of the invention.

Vastly superior adhesion to all melamine coatings evaluated is shown by the modified TPOs of the invention.

J. Adhesion of MTPO Examples 10–12 to Various Waterborne Coatings and a Neat Epoxy The adhesion of various waterborne polyurethane and alkyd coatings and a neat epoxy coating to MTPO Examples 10–12 is evaluated using the crosshatch adhesion test. All coatings are cured at 120° C. for 20–30 minutes and then at room temperature for 24 hours before testing. Results are as reported in Table 10. Similar testing is done on unmodified TPO (Comparative Sample A), with those results also as appearing in Table 10.

TABLE 10

Adhesion of MTPO Examples 10–12 to Various Coatings

| | Crosshatch Adhesion Ratings (by Coating Type) | | | | | | | |
|---|---|---|---|---|---|---|---|---|
| Example No. | A* | B* | C* | D* | E* | F* | G* | H* |
| 10 | 0 | 0 | 5 | 0 | 5 | 5 | 0 | 5 |
| 11 | 0 | 0 | 5 | 3 | 5 | 5 | 0 | 5 |
| 12 | 0 | 0 | 4 | 0 | 5 | 5 | 0 | 5 |
| A** | 0 | 0 | 0 | 0 | 0 | 0 | 0 | 0 |

*A—Polyurethane coating solid as NeoRez 960 (Zeneca Resin Co.); B—Polyurethane coating sold as NeoRez 962 (Zeneca Resin Co.); C—Polyurethane coating sold as NeoRez 9649 (Zeneca Resin Co.); D—Polyurethane coating sold as Sancure 898 (BF Goodrich Specialty Chemical Co.); E—Alkyd coating sold as Resydrel VAY 6278 (Hoechst Celanese Co.); F—Alkyl coating sold by Patriot Paint Co., Inc.; G—Alkyd coating sold as Resydrel AY 586 (Hoechst Celanese Co.); H—mixture of epoxy resin GY6004, epoxy resin GY 508 and Hardener HY 355 at 1/0.74/0.35 weight ratio.

The testing of MTPO Examples 10–12 shows markedly improved adhesion to several, but not all, of the waterborne coatings relative to their adhesion to the unmodified TPO. As noted with respect to MTPO Example 1, the epoxy coating cracks when the epoxy-coated test panels of MTPO Example 10–12 are bent, but remains adhered to the test panel in all cases.

K. Adhesion of MPTO Examples 10–12 to Various Solvent-Borne Coatings

Similar testing of MTPO Examples 10–12 is performed using various solvent-borne coatings. Results are as reported in Table 11. Again, results of testing of Comparative Sample A are included for comparison.

TABLE 11

Adhesion of MTPO Examples 10–12 to Various Solvent-Borne Coatings

| Example No. | Crosshatch Adhesion Ratings (by Coating Type) | | | | | |
|---|---|---|---|---|---|---|
|  | I* | J* | K* | L* | M* | N* |
| 10 | 5 | 5 | 4 | 3 | 5 | 5 |
| 11 | 5 | 5 | 5 | 5 | 5 | 5 |
| 12 | 5 | 5 | 0 | 3 | 3 | 5 |
| A** | 0 | 0 | 0 | 0 | 0 | 0 |

*I-Alkyd from short oil, sold as 809-5127 by Peninsula Polymers, Inc.;
J-Monomer modified alkyd, sold as 804-5732 by Peninsula Polymers, Inc.;
K-Phenolic modified alkyd, sold as 808-4664 by Peninsula Polymers, Inc.;
L- Alkyd from medium oil, sold as 802-1006 by Peninsula Polymers, Inc.;
M-Alkyd from epoxy ester, sold as 813-1405 by Peninsula Polymers, Inc.;
N-Polyester, sold as Cyplex 1473-35 by Peninsula Polymers, Inc. All of the alkyd resins contain 1% of a 50/50 w/w mixture of two mixing dryers (NUXTRA LTD, 12% Rare Earth Hex-Cem and 6% cobalt Hex-Cem, Mooney Chem., Inc.). The polyester coating contains a melamine crosslinking agent (Cymel 303, by Cytec Industries) and a commercially available catalyst, Cycat 4040 (also Cytec Industries).
**Not an example of this invention.

As can be seen from the data in Table 11, blends according to the invention provide improved adhesion to a variety of solvent-borne coatings.

What is claimed is:

1. A modified polyolefin comprising a blend of a polyolefin polymer and an adhesion-promoting additive that is compatible with said polyolefin, wherein the adhesion-promoting additive contains a polyolefin backbone with at least one pendant polar chain structure having at least one ester linkage and at least one hydroxyl or oxirane moiety, said pendant polar chain structure having a molecular weight of at least about 200 daltons.

2. The modified polyolefin of claim 1 wherein the adhesion-promoting additive has a polypropylene backbone having a number average molecular weight of at least about 3000 daltons.

3. The modified polyolefin of claim 2 wherein the pendant polar chain structure of the adhesion-promoting additive includes a polyether chain containing repeating oxyalkylene groups and the pendant polar chain structure has a molecular weight of from about 500 to about 4,000 daltons.

4. The modified polyolefin of claim 3, wherein the adhesion-promoting additive is formed in the reaction of a polypropylene polymer containing at least one carboxylic acid, carboxylic acid anhydride or carboxylic acid ester group and a polyethylene oxide polyol having at least two hydroxyl groups per molecule.

5. The modified polyolefin of claim 4, wherein the polypropylene polymer contains at least one carboxylic acid anhydride group and the mole ratio of the polypropylene polymer containing at least one carboxylic acid anhydride group to polyethylene oxide polyol is from 0.7–1.3:1.

6. The modified polyolefin of claim 4, wherein the polyolefin polymer is polypropylene.

7. The modified polyolefin of claim 4, wherein the polyolefin polymer is a TPO.

8. The modified polyolefin of claim 2, wherein the pendant polar chain structure of the adhesion-promoting additive includes polymerized hydroxy-functional acrylate monomers, and the pendant polar chain structure has a molecular weight of from about 2000 to about 10,000 daltons.

9. The modified polyolefin of claim 8, wherein the polyolefin polymer is polypropylene.

10. The modified polyolefin of claim 8, wherein the polyolefin polymer is a TPO.

11. The modified polyolefin of claim 2, wherein the adhesion-promoting additive is formed in the reaction of a polypropylene polymer containing at least one carboxylic acid, carboxylic acid anhydride or carboxylic acid ester group and a compound containing at least two oxirane groups.

12. The modified polyolefin of claim 11, wherein the compound containing at least two oxirane groups is an epoxy resin selected from the group consisting of aromatic epoxy resins, Novolac resins, aliphatic epoxy resins and cycloaliphatic epoxy resins.

13. The modified polyolefin of claim 12, wherein the polypropylene polymer contains at least one carboxylic acid anhydride group and the mole ratio of the polypropylene polymer containing at least one carboxylic acid anhydride group to the compound containing at least two oxirane groups is from 0.7–5:1.

14. The modified polyolefin of claim 12, wherein the polyolefin polymer is polypropylene.

15. The modified polyolefin of claim 12, wherein the polyolefin polymer is a TPO.

16. The modified polyolefin of claim 1 which contains from about 5 to about 40 parts by weight of the adhesion-promoting additive per 100 parts by weight modified polyolefin.

17. The modified polyolefin of claim 3 which contains from about 5 to about 40 parts by weight of the adhesion-promoting additive per 100 parts by weight modified polyolefin.

18. The modified polyolefin of claim 8 which contains from about 5 to about 40 parts by weight of the adhesion-promoting additive per 100 parts by weight modified polyolefin.

* * * * *